No. 612,790. Patented Oct. 18, 1898.
A. C. TANNER.
DRIVE AND BRAKE MECHANISM FOR BICYCLES.
(Application filed Aug. 20, 1897.)
(No Model.) 4 Sheets—Sheet 1.
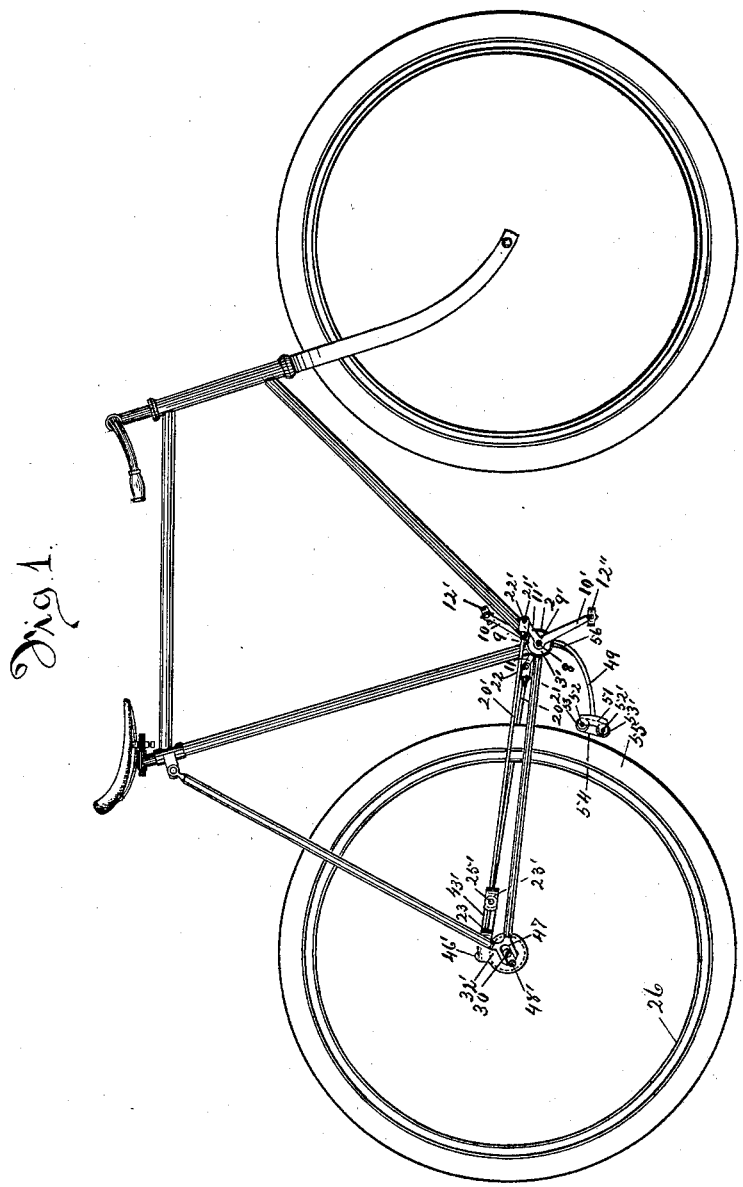

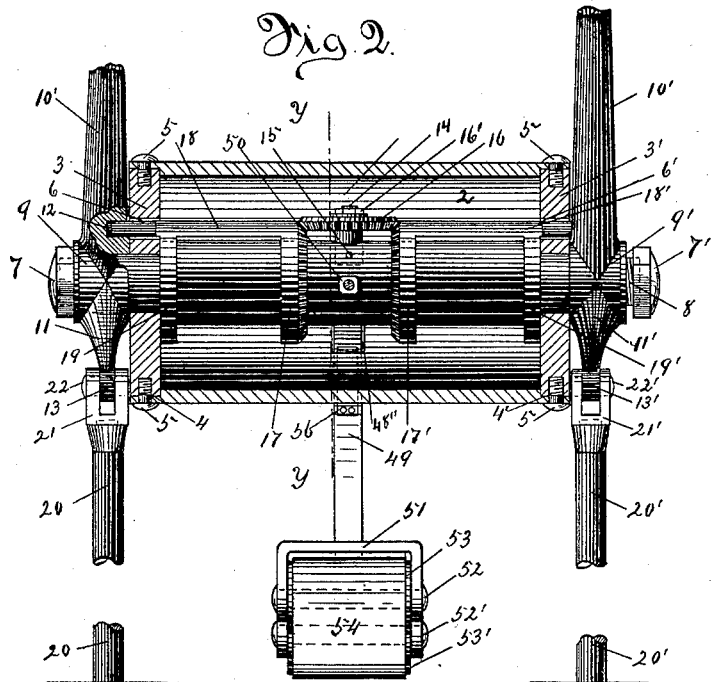
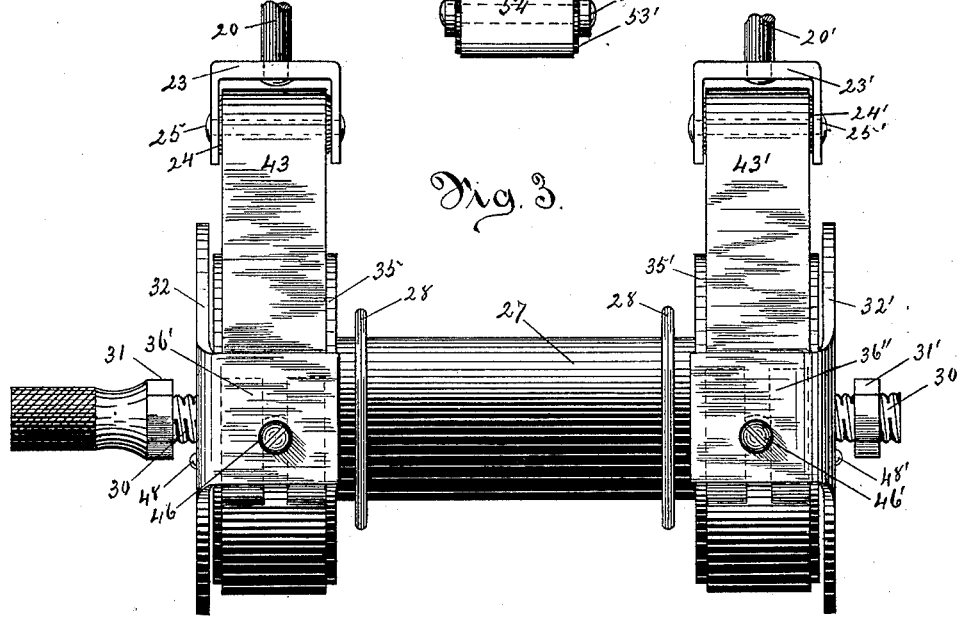

No. 612,790. Patented Oct. 18, 1898.
A. C. TANNER.
DRIVE AND BRAKE MECHANISM FOR BICYCLES.
(Application filed Aug. 20, 1897.)
(No Model.) 4 Sheets—Sheet 3.
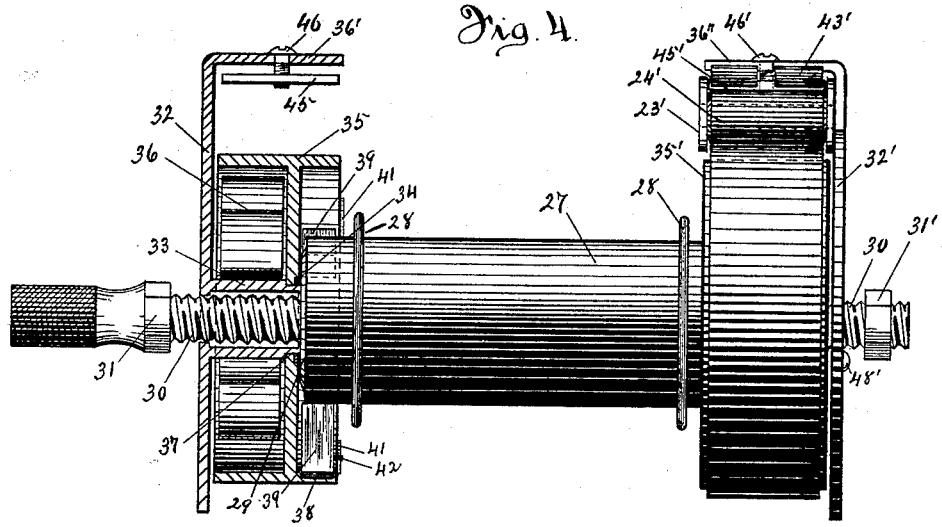
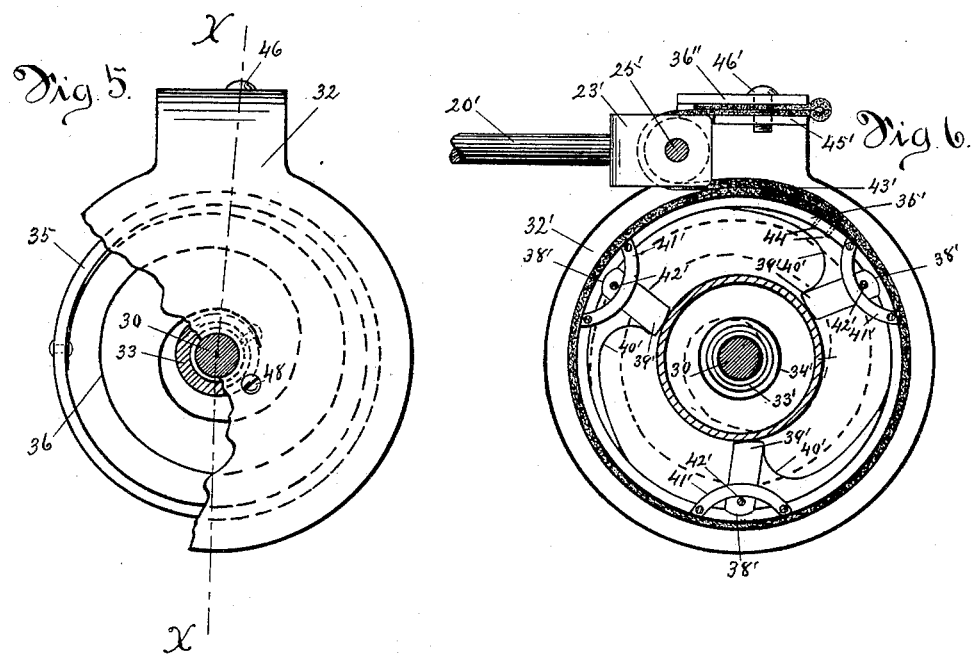
Witnesses
F. W. Beardsley
J. W. Wenzel
Inventor
Albert C. Tanner No. 612,790. Patented Oct. 18, 1898.
A. C. TANNER.
DRIVE AND BRAKE MECHANISM FOR BICYCLES.
(Application filed Aug. 20, 1897.)
(No Model.) 4 Sheets—Sheet 4.
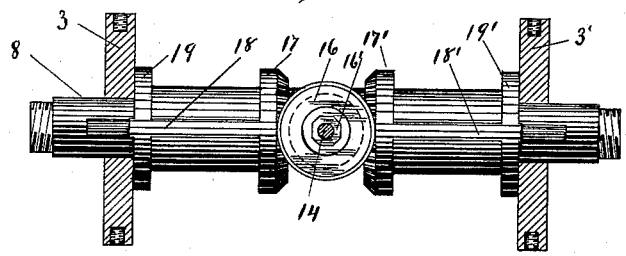
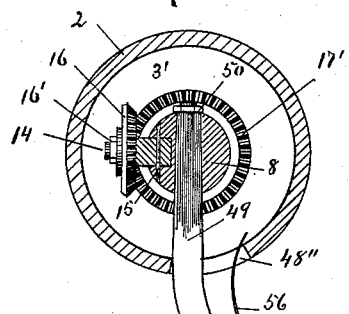
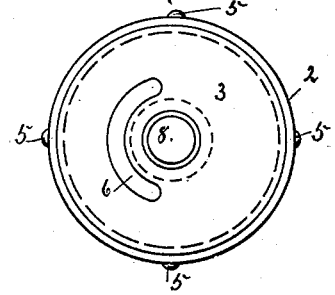
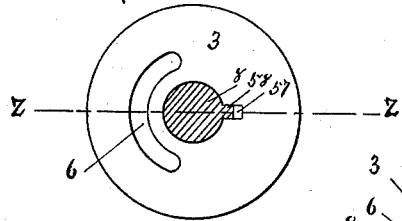
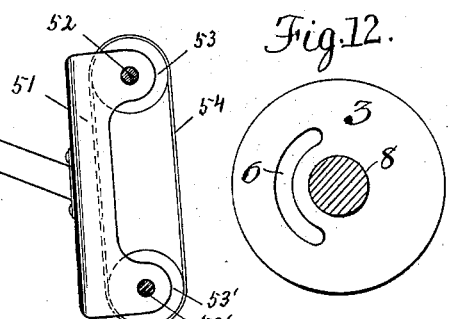
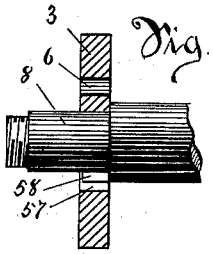
Witnesses
Inventor
Albert C. Tanner

UNITED STATES PATENT OFFICE.

ALBERT C. TANNER, OF JERSEY CITY, NEW JERSEY, ASSIGNOR TO FRANK W. BEARDSLEY, OF NEW YORK, N. Y.

DRIVE AND BRAKE MECHANISM FOR BICYCLES.

SPECIFICATION forming part of Letters Patent No. 612,790, dated October 18, 1898.

Application filed August 20, 1897. Serial No. 648,926. (No model.)

*To all whom it may concern:*

Be it known that I, ALBERT C. TANNER, a citizen of the United States, residing at Jersey City, in the county of Hudson and State of New Jersey, have invented certain new and useful Improvements in Drive and Brake Mechanism for Bicycles and Like Vehicles, which improvements are fully set forth in the following specification and accompanying drawings.

Figure 1 is a side elevation view of a bicycle having my improved drive and brake mechanism applied thereto. Fig. 2 is a central longitudinal section of that part of the bicycle-frame commonly known as the "crank-hanger" and shows the form and disposition of certain parts located within and adjacent to said crank-hanger. Fig. 3 is a plan view of certain elements of my improved mechanism and shows the disposition of same with respect to the hub of the drive-wheel of the bicycle. Fig. 4 is a rear end view of the assembled parts shown in Fig. 3, a portion thereof being shown in central vertical section as on the line $xx$ of Fig. 5. Fig. 5 is an outer face or elevation view of one of the brackets made use of, a portion thereof being broken away to more clearly disclose the form and disposition of certain parts carried thereby; and Fig. 6 is an inner face or elevation view of the opposite bracket, the same showing the clutch mechanism made use of. Fig. 7 is a detail view showing parts mounted on the crank-axle as they appear when revolved upward ninety degrees from the position they occupy in Fig. 2. Fig. 8 is a sectional view showing certain novel parts operative in conjunction with the parts located within and adjacent to the crank-hanger and essential for controlling the speed of the bicycle, the section being taken on the line $yy$ of Fig. 2. Fig. 9 is an end view of the crank-hanger with crank-axle bearing-pieces disposed therein, the cranks being removed. Fig. 10 is a detail view showing lateral recess in the central opening in one of the crank-axle bearing-pieces together with outlines of rib on said crank-axle. Fig. 11 is a detail sectional view of same as on the line $zz$ of Fig. 10. Fig. 12 is a detail view similar to Fig. 10, the rib on the crank-axle shown in the latter figure being dispensed with.

Similar reference-numerals denote like parts throughout the several views.

This invention relates generally to improvements in that class of assembled mechanical parts commonly known as "drive and brake" mechanism, and particularly to drive and brake mechanism of a character capable of being applied to bicycles and similar vehicles, the said mechanism being utilized by the rider in propelling the bicycle or other vehicle to which it may be applied and in controlling the speed thereof.

The object of this invention is to provide a drive and brake mechanism for bicycles and similar vehicles whereby certain important advantages may be gained over prior analogous mechanisms, particularly in the way of novelty and simplicity in construction and in increased efficiency in operation.

The invention consists in the employment of certain novelly-formed parts, (principally in duplicate,) in the novel disposition and arrangement of the various parts, in certain combinations of the latter, and in certain details of construction, all of which will be specifically referred to hereinafter.

Having reference to the accompanying drawings, the bicycle shown in Fig. 1 is of ordinary design and construction, and 2 denotes that part of the frame of said bicycle commonly known as the "crank-hanger." Bearing-pieces 3 3', each in the form of a disk, are inserted one into an interior annular recess 4, formed in the crank-hanger 2 at one end thereof, and the other into a corresponding recess 4', formed in the opposite end of the crank-hanger 2. Any suitable fasteners, as the screws 5, may be utilized for holding the respective bearing-pieces 3 3' rigidly in place. The bearing-piece 3 is provided with a concentric slot-like opening 6 and a suitable central opening, and the bearing-piece 3' is provided with a like concentric opening 6' and a like central opening. The functions of the concentric openings 6 6' will clearly appear hereinafter.

The crank-axle 8 is disposed longitudinally within and centrally of the crank-hanger 2, one end of the same being reduced in diameter and bearing in the central opening in the bearing-piece 3 and the opposite end thereof being correspondingly reduced in diameter and bearing in the central opening in the bearing-piece 3'.

The reductions in the diameter of the crank-axle 8 are made to form shoulders which shall abut one against the bearing-piece 3 and the other against the bearing-piece 3', thereby obviating longitudinal movement or displacement of the crank-axle 8.

The reduced end of the crank-axle 8, which bears in the central opening in the bearing-piece 3, projects outward therefrom a distance suitable to admit of there being loosely mounted thereon a bell-crank 9, said bell-crank comprising a main member 10 and a shorter member 11, the latter arranged at a suitable angle to the former, and a like bell-crank 9' is correspondingly mounted upon the opposite reduced end of the crank-axle 8, which bears in the central opening in the bearing-piece 3' and projects outward therefrom a suitable distance.

The bell-crank 9 is provided with a suitable recess 12 and the bell-crank 9' with a like recess, the functions of which recesses will clearly appear hereinafter.

The respective extreme ends of the crank-axle 8 are still further reduced in diameter and suitably threaded to receive nuts 7 7', the latter serving, respectively, to prevent undue removal or displacement of the cranks 9 9'.

Suitable foot-pedals 12' 12" are applied one to the free end of each of the main members 10 10' of the bell-cranks 9 9', respectively. The shorter members 11 11' of the bell-cranks 9 9' are provided one with an eye 13 and the other with a like eye 13'.

The crank-axle 8, midway of its length, is provided with a suitable recess, into which is tightly inserted the stud 14, the latter being held firmly in place by means of the pin 15, forced into suitable registering openings in the stud 14 and the crank-axle 8, as clearly shown in Fig. 8. The stud 14 is suitably shouldered, and thereon is rotatably mounted a bevel-toothed pinion 16, held to place by means of the nut 16'.

There is rotatably mounted upon the crank-axle 8, at one side of the pinion 16, a collar 17, provided with beveled teeth meshing at all times with the teeth of said pinion 16, and a like collar 17' is correspondingly mounted on the crank-axle 8 at the opposite side of the pinion 16, and the teeth of said collar 17' also mesh at all times with the teeth of the pinion 16. The collar 17 is provided with an integrant arm 18, which extends along parallel with and adjacent to the crank-axle 8, projects outward through the slot-like opening 6 in the bearing-piece 3, and engages the recess 12 in the crank 9. The collar 17' is provided with a like arm 18', which extends outward through the slot-like opening 6' in the bearing-piece 3' and engages the recess in the crank 9', corresponding with the recess 12 in the crank 9.

To obviate any binding tendency of the collars 17 17' on the axle 8, additional collars 19 19', preferably formed integral with the arms 18 18', respectively, may be used.

The drive-rod 20 is provided at its forward end with a clip 21, within which is loosely held, by means of the pivot 22, the eye 13 of the bell-crank member 11, and said drive-rod is further provided, at its rear end, with an enlarged clip 23, carrying a roller 24, mounted to rotate on the pivot 25. The drive-rod 20' is provided at its forward end with a clip 21', within which is loosely held, by means of the pivot 22', the eye 13' of the bell-crank member 11', and said drive-rod is further provided, at its rear end, with an enlarged clip 23', carrying a roller 24', mounted to rotate on the pivot 25'.

26 is the drive-wheel of the bicycle, mounted in the usual way to turn on the fixed axle 30.

27 is the hub of the drive-wheel, the same being provided with the usual spoke-flanges 28. Bearing cones of the ordinary type are employed in the bearings for the hub 27, and by preference these cones when adjusted project somewhat, respectively, from the ends of the hub 27, and in addition to their functions as bearing elements they serve to check the movement of certain adjacent parts in one direction along the axle 30, as will clearly appear hereinafter. One of said cones (partially exposed in Fig. 4) is indicated by the numeral 29. The axle 30 is properly threaded to receive the said bearing-cones and also to receive the fastening-nuts 31 31', one upon each end of said axle.

The bracket 32 is provided with an angular offset 36' and with a suitable central opening which is surrounded upon the inner side of said bracket by the tubular member 33, the latter by preference being formed integral with said bracket. The bracket 32 is mounted upon the axle 30 adjacent to one end of the wheel-hub 27 and so that the inner end of the member 33 abuts against the cone 29, all as clearly shown in the drawings.

The drum 35 comprises a peripheral portion having a uniform outer face and a central web, the latter disposed in the peripheral portion so that a chamber or depression is secured at one side of said web, within which chamber is arranged a coiled spring 36, the same being firmly attached one end to the tubular member 33 and the other end to the peripheral portion of the drum 35, said spring serving to hold the drum 35 yieldingly against rotation in the forward direction, and at the opposite side of the central web, in the drum 35, another chamber or depression is secured, which admits of the surrounding peripheral portion of the drum 35 overlapping the adjacent end of the drive-wheel hub 27, as clearly illustrated in the drawings.

I provide the tubular member 33 at its inner end with an exterior annular recess 37, which serves as a bearing, on which is rotatably mounted the drum 35, a suitable central opening being formed in the central web of the drum 35 to admit of thus mounting the same, and the drum 35 may be held in place on its bearing in any convenient manner, as by means of the flat ring 34, disposed on the recessed end of the member 33 outside of and adjacent to the central web of the drum 35, said ring being by preference held against displacement by heading over the end of the tubular member 33.

That section of the peripheral portion of the drum 35 which overlaps the adjacent end of the drive-wheel hub 27 is provided with a series of concaved interior recesses 38, preferably not less than three in number. A series of detached clutches 39, corresponding in number with the number of recesses 38, are employed, and these clutches extend one from each of the recesses 38 to and against the adjacent end of the drive-wheel hub 27 and each occupies a position slightly oblique to the radius of the drum 35, and consequently of the drive-wheel hub 27.

One end of each clutch in the series made use of is given a suitable convex form to fit nicely in its individual recess 38, and its opposite end is preferably given the form of an irregular curve and is held yieldingly to contact with the adjacent end of the drive-wheel hub 27 by means of a suitable spring, as 40', Fig. 6, which spring may be soft-soldered or otherwise secured one end to the clutch and the other end to the overlapping peripheral portion of the drum 35.

To prevent lateral displacement thereof, each clutch 39 is provided with a guard 41, secured in any convenient and well-known manner to the peripheral portion of the drum 35, and to prevent endwise displacement of the clutches 39 when the bracket 32 (with the parts mounted thereon) is removed from the axle 30 I provide each clutch 39 with a pin 42, adapted to take over its individual guard 41.

From the foregoing description of the clutch mechanism made use of it will be seen that none of the clutches is provided with a bearing-point, but in operation each binds between the hub 27 and the peripheral portion of the drum when the latter is rotated in the forward direction. In practice these clutches are not only highly efficient, but noiseless in operation.

Upon the axle 30 and adjacent to the opposite end of the hub 27 there is mounted a bracket 32', provided with offset 36" and tubular member 33', on which is mounted the spring-controlled rotatable drum 35', held to place by flat ring 34'. There are further provided clutches 39' to operate in conjunction with the drum 35' in interior recesses 38', and each clutch is provided with a guard 41', pin 42', and spring 40', all of which are mere duplicates of and are arranged to operate in identically the same way as parts hereinbefore described, and a more detailed description of same is therefore unnecessary.

A flexible drive connection 43, preferably of rawhide, is secured one end to the peripheral portion of the drum 35, as by means of rivets 44, and is capable of being wound upon the uniform outer face of said peripheral portion of the drum 35. The opposite end of said drive connection is passed upward between the forks of the enlarged clip 23 and around the roller 24 in said clip and is fastened to the angular offset 36' of the bracket 32. For thus fastening the end of the drive connection 43 to the bracket-offset 36' I provide a clamp 45, having a suitable threaded opening, into which takes the threaded end of the screw 46, the latter projecting downward through a suitable opening formed in the bracket-offset 36'. The end of the drive connection is forked, as indicated in Fig. 3, and the respective branches are folded each upon itself and inserted endwise between the clamp 45 and the bracket-offset 36', astride the screw 46, are pinched tightly between said clamp and said bracket-offset when the screw 46 is turned in one direction, and may be liberated therefrom by turning the screw 46 in the opposite direction, as will be readily understood. The drive connection 43' is of the same material and is arranged to operate in connection with the drum 35' and clip 23', containing roller 24', in identically the same manner as the drive connection 43 operates in connection with the drum 35 and clip 23, containing roller 24, and its forked end is secured to the angular bracket-offset 36" by means of clamp 45' and screw 46' in identically the same manner as the forked end of the drive connection 43 is secured to the bracket-offset 36'. Therefore a further description of same is unnecessary.

The usual rear forked frame connections, one of which is indicated by the numeral 47 in Fig. 1, straddle the axle 30 one between the nut 31 and the bracket 32 and the other between the nut 31' and the bracket 32', and when these nuts 31 31' are screwed tightly each against the adjoining frame connection above referred to the bracket 32, with its tubular member 33, is urged along the axle 30 till the inner end of said tubular member is brought up snugly against the cone 29, and the bracket 32', with its tubular member 33', is likewise urged along the axle 30 till the inner end of said tubular member 33' is brought up snugly against the corresponding cone in the opposite end of the wheel-hub 27, and the brackets 32 32' are consequently held firmly in position upon the axle 30. To avoid any possible tilting tendency of said brackets on the axle 30, I provide one bracket with a projection 48 and the other bracket with a like projection 48'. The projection 48' engages the fork of the rear frame connection 47, as shown in Fig. 1, and the projection 48 engages the fork of the corresponding frame connection at the opposite side of the drive-wheel. The bracket 32 may be provided with an opening suitably threaded to receive a screw having a substantial head, which screw-head will serve for the projection 48, and the bracket 32' may have a like opening with a like screw located therein, and the head of said screw will serve for the projection 48'.

The mechanism thus far described is utilized in propelling the bicycle, and in connection therewith it is essential that means be provided whereby the speed of the bicycle may be effectually controlled. To this end I form in the crank-hanger 2 a suitable transverse slot-like opening 48", and I form in the crank-axle 8, at a point registering with said slot-like opening when the crank-axle 8 is in place, an opening having, by preference, tapered walls. The tapered end of the curved brake-lever 49 is passed through the opening 48", inserted into the tapered opening in the crank-axle 8, and held firmly in the latter by means of the nut 50, the said tapered end of the brake-lever 49 being suitably tapped and threaded to receive said nut. There is firmly secured to the opposite end of the brake-lever 49 a double clip 51, within which are mounted to rotate, as on the pivots 52 52', twin rollers 53 53', one above the other, and there is disposed on said rollers an endless apron 54, of leather, canvas, or other suitable material, which is brought in contact with the tire 55 of the drive-wheel 26 when the lever 49 is moved rearward in the plane of said drive-wheel, a result secured when the axle 8 is rotated forwardly in its bearings, as hereinafter explained. In practice the apron 54 has a tendency to lap around the tire 55, thereby presenting to said tire an effective contact-surface.

56 is a stiff leaf-spring one end of which is secured in any convenient manner to the brake-lever 49 and so that its opposite end will engage the slot 48" in the crank-hanger 2, as clearly shown in Fig. 8. The tension of this spring should be sufficient to prevent any rotatable movement of the axle 8, and consequently any rearward movement of the brake-lever 49, when the cranks 9 9' are worked alternately, as hereinafter explained.

Where the brake mechanism herein described is used, it is obvious that the crank-axle 8 should be arranged to rotate in the bearing-pieces 3 3'; but where it is desired to substitute for the brake mechanism herein described other means for controlling the speed of the bicycle the axle 8 should be held against rotation in the bearing-pieces 3 3'. Therefore I provide the central opening in the bearing-piece 3 with a lateral recess 57, and further provide the axle 8 with a rib 58, adapted to engage the recess 57 when the parts are in place. A like lateral recess may be formed in the central opening in the opposite bearing-piece, and the opposite end of the axle 8 may be provided with a like rib, if deemed necessary or desirable. Other common and well-known means may be availed of for this purpose when conditions make the same desirable.

The operation of my improved drive and brake mechanism is as follows: The rider, placing his left foot on pedal 12', depresses crank 9 to, say, the limit of its downward throw, which through the medium of the drive-rod 20 effects the withdrawal of the drive connection 43 in the form of a loop from the drum 35, thereby suitably rotating the latter in the forward direction, and said drum through the action of the detached clutches 39 takes with it the drive-wheel 26. During this stage of the operation the collar 17 through the medium of the arm 18, engaging the recess 12 in the crank 9, is rotated forwardly on the axle 8, thereby imparting a suitable rotary motion to the pinion 16, with the result that the collar 17' is rotated rearwardly on the axle 8, and through the medium of the arm 18' the crank 9' is returned to the limit of its upward throw. The rider, now having his right foot on pedal 12", depresses crank 9' to, say, the limit of its downward throw, with the result that the drive-wheel 26 is rotated forwardly through the action of the intermediate parts, as hereinbefore explained, and the crank 9 is returned to the limit of its upward throw. During this alternate operation of the parts the drums 35 35' are returned each to its normal position by means of the coiled springs arranged to operate in conjunction therewith; also, through the action of these springs a suitable tension is at all times imparted to the drive connections 43 43'. The rider now having attained a certain rate of speed and wishing to decrease the same more or less depresses simultaneously the cranks 9 9', varying the pressure, which he employs to suit his own requirements, and thereupon the collars 17 17', with their respective arms 18 18', assume the character of fixed parts upon the axle 8, the pinion 16 remains stationary upon the stud 14, and the axle 8 is rotated forwardly in its bearings, with the result that the brake-lever 49 is moved rearwardly in the plane of the drive-wheel 26, overcoming in its progress the tension of the spring 56, and the apron 54 on the rollers 53 53' is urged against the tire 55 on said drive-wheel, thus diminishing the speed of the latter.

It will be observed that propulsion of the bicycle is effected through alternate depression of the cranks 9 9', and the speed thereof is controllable through simultaneous depression of said cranks.

From the foregoing description of my improved drive and brake mechanism it will be seen that the same is especially well adapted for the purpose for which it is designed, and it is also obvious that the invention is susceptible of considerable modification without material departure from its principles and spirit, and for this reason I do not wish to be understood as limiting myself to the precise construction and arrangement of the parts as herein shown and described.

Having fully described my invention, what I claim, and desire to secure by Letters Patent, is—

1. In a bicycle, or like vehicle, in combination with the drive-wheel, mounted to rotate on a fixed axle, a supporting medium, rigidly mounted on said axle, a drum, rotatably mounted on said supporting medium, detached clutches, movable with said drum, and having their free ends in contact with the drive-wheel hub, said clutches being arranged with respect to the drum, in such manner as to lock the drum, when rotated in one direction, to the drive-wheel hub, guards, for preventing lateral displacement of said clutches, the latter being each provided with a pin, adapted to engage the adjacent guard, to prevent endwise displacement of said clutches, when said drum is removed from its supporting part, and means for rotating said drum, all substantially as herein described.

2. In a bicycle, or like vehicle, in combination with the drive-wheel, a bracket, firmly mounted on the drive-wheel axle, said bracket being provided with an angular offset, and with a central, tubular member, adapted to encircle the drive-wheel axle, a drum, rotatably mounted on said tubular member, means for locking the drum, when rotated in one direction, to the hub of the drive-wheel, a flexible drive connection, having one end secured to, and capable of being wound upon, said drum, and having its opposite end secured to the angular offset of said bracket, means for withdrawing the drive connection from said drum, in the form of a loop, for rotating said drum, and means for returning the latter to its normal position, all substantially as herein described.

3. In a bicycle, or like vehicle, in combination with the drive-wheel mounted to rotate on a fixed axle, a supporting medium, rigidly mounted on said axle, a bracket, firmly mounted upon the drive-wheel axle, a drum rotatably mounted on said supporting medium, and comprising a peripheral portion, having a series of interior recesses, and a central web, and said drum being mounted so that said peripheral portion will overlap the drive-wheel hub, detached clutches, disposed, one in each of said recesses, and extending therefrom to the drive-wheel hub, means for preventing lateral and endwise displacement of said clutches, springs adapted to urge the free ends of said clutches to contact with the drive-wheel hub, and means for rotating said drum, all substantially as herein described.

4. In a bicycle, or like vehicle, in combination, a rigidly-mounted bracket, provided with an angular offset, and a central member, a drum, rotatably mounted on said central member, a flexible drive connection, having one end secured to, and capable of being wound upon, said drum, and having its opposite end secured to the angular offset of said bracket, a drive-rod, provided with a clip, containing a roller, the latter engaging said drive connection in a manner to withdraw the same from said drum, in the form of a loop, when said drive-rod is moved endwise away from said bracket, and means for thus moving said drive-rod, all substantially as herein described.

5. In a bicycle, or like vehicle, in combination with the crank-hanger, bearing-pieces, rigidly disposed, one in each end of said hanger, and each provided with a suitable, concentric opening, an axle, mounted centrally in said bearing-pieces, cranks, loosely mounted, one on each end of said axle, a bevel-toothed pinion, rotatably mounted midway of said axle, and bevel-toothed collars, mounted on said axle, one on each side of said pinion, the said collars meshing at all times with said pinion, and each being provided with an arm, arranged to project outward through the concentric opening in the adjacent bearing-piece, and engage the adjacent crank, to the end that said collars may be rotated on said axle in unison with the movements of said cranks, when the latter are moved, all substantially as herein described and for the purpose set forth.

6. In a bicycle, or like vehicle, in combination with the crank-hanger, bearing-pieces, rigidly disposed, one in each end of said crank-hanger, an axle, rotatably mounted in said bearing-pieces, means for holding said axle yieldingly against rotation, cranks, loosely mounted one on each end of said axle, means, within said crank-hanger, for insuring alternate movement of said cranks, save when simultaneously depressed, and a brake-lever, secured to, and depending from, said axle, and provided at its free end with a suitable contact part, the parts being disposed so that the cranks, when alternately depressed, will work upon said axle, and when simultaneously depressed, a rotary movement will be imparted to the crank-axle, whereby the contact part on the brake-lever, will be brought into engagement with the tire of the drive-wheel, all substantially as herein described.

7. In a bicycle or like vehicle, in combination, a rotatably-mounted crank-axle; means for holding the crank-axle yieldingly against rotation; cranks, loosely mounted one on each end of the crank-axle; a bevel-toothed pinion, rotatably mounted parallel with, and midway the length of, the crank-axle; bevel-toothed collars, loosely mounted on said crank-axle, one on each side of, and in mesh with, said pinion; and a brake-lever, secured to and projecting away from, said crank-axle, said brake-lever being provided with a suitable contact part, and said collars being capable of joint movement, each with the adjacent crank, as herein specified.

8. In a bicycle or like vehicle, having a crank-hanger, in combination, bearing-pieces, rigidly secured one in each end of said crank-hanger, and each provided with a suitable opening; a crank-axle, rotatably mounted in said bearing-pieces; means for holding the crank-axle yieldingly against rotation; cranks, loosely mounted one on each end of the crank-axle; a bevel-toothed pinion, rotatably mounted parallel with, and midway the length of, the crank-axle; bevel-toothed collars, loosely mounted on said crank-axle, one on each side of, and in mesh with, said pinion; and a brake-lever, secured to, and projecting away from, said crank-axle, said brake-lever being provided with a suitable contact part, and said collars being provided, the one with an arm projecting outward through the opening in the adjacent bearing-piece, and engaging the adjacent crank, and the other with an arm projecting outward through the opening in the opposite bearing-piece, and engaging the opposite crank, as herein specified.

9. In a bicycle, or like vehicle, in combination with the drive-wheel, a suitably-disposed crank-axle, bell-cranks, loosely mounted, one on each end of said crank-axle, drive-rods, one loosely connected, at its forward end, to the shorter member of each of said bell-cranks, and each provided with a clip, at its rear end, containing a roller, brackets, firmly mounted on the drive-wheel axle, one adjacent to each end of the drive-wheel hub, and each provided with an angular offset, and a central member, adapted to encircle the drive-wheel axle, drums, rotatably mounted, one on the central member of each of said brackets, flexible drive connections, one taking around the roller in the adjacent drive-rod clip, and arranged to be wound upon one of said drums, and withdrawn therefrom in the form of a loop, for rotating said drum, and the opposite drive connection taking around the roller in the opposite drive-rod clip, and arranged to be wound upon the opposite drum, and withdrawn therefrom in the form of a loop, for rotating the last-named drum, means for locking the drums, when thus rotated, to the drive-wheel hub, means for yieldingly holding said drums in their normal positions, and means for insuring alternate action of the bell-cranks, all substantially as herein described and for the purpose set forth.

ALBERT C. TANNER.

Witnesses:
S. DE WALLTEAESS,
H. B. DUNHAM.